Jan. 16, 1962     R. L. JAESCHKE     3,016,580
METHODS FOR FORMING RIGID COMPOSITE STRUCTURES
Filed March 24, 1958

Ralph L. Jaeschke,
Inventor.
Koenig and Pope,
Attorneys.

3,016,580
METHODS FOR FORMING RIGID COMPOSITE STRUCTURES

Ralph L. Jaeschke, Kenosha, Wis., assignor to Eaton Manufacturing Company, Cleveland, Ohio, a corporation of Ohio
Filed Mar. 24, 1958, Ser. No. 723,206
3 Claims. (Cl. 18—59)

This invention relates to methods for forming rigid composite structures, and more particularly to methods for forming structures such as clutch and brake components having elements thereof bonded together by cured epoxy resin products.

This application is a continuation-in-part of my copending application Serial No. 671,706, filed July 15, 1957, now abandoned.

Among the several objects of this invention may be noted the provision of methods for forming rigid composite structures in which the cured bonded product develops a high HDT, such as in the order of 450°–550° F.; the provision of such methods wherein the components of a resin-filler-curing agent system are premixed and have a long pot life, such as in the order of five days; the provision of such methods in which the composite structure is put into use after curing at relatively low temperatures for relatively short periods of time; and the provision of methods in which the initial HDT of the resin product bonding the rigid composite structure together is progressively increased during operation of the structure, so that it always exceeds the operating temperature of the structure. Other objects and features will be in part apparent and in part pointed out hereinafter.

Figure 1:
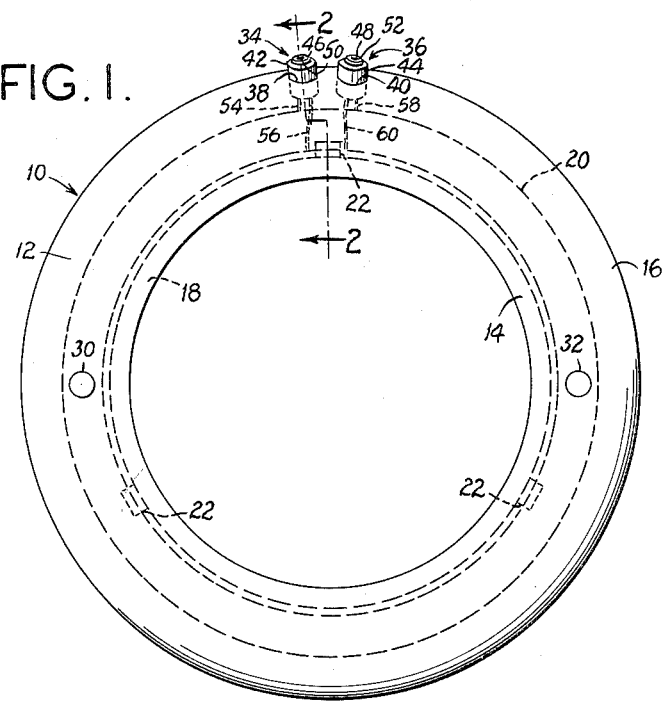
Figure 2:
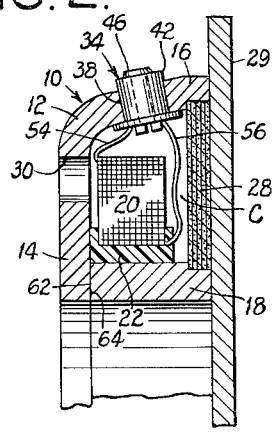
Figure 3:
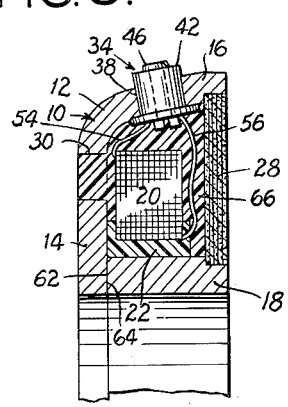

In the accompanying drawings, in which one of various possible embodiments of the invention is illustrated, FIG. 1 is a rear view of a rigid composite structure made in accordance with a method of the present invention;

FIG. 2 is a cross section taken on line 2—2 of FIG. 1 showing the assembled components of the structure prior to filling with a resin suspension with certain parts being rotated into the plane of the section 2—2; and, FIG. 3 is a view corresponding to FIG. 2 showing the assembled and bonded components of the composite structure after filling the structure with a resin suspension and curing said resin suspension.

Corresponding reference characters indicate corresponding parts throughout the several views of the drawings.

In the manufacture of rigid composite structures, such as brake or clutch components, etc. (e.g., such as that shown in my copending application Serial No. 638,130, filed February 21, 1957) which normally operate at relatively high temperatures (i.e., in the range of up to approximately 500° F.) it has been found that substantial economies can be effected by bonding the components together by a cured resin product having a high HDT (heat distortion temperature). By doing this the costs of machining, welding and other steps heretofore used in the manufacture of said structures can be greatly minimized or eliminated. The present invention provides a method utilizing epoxy resins for efficiently producing such structures. Among the difficulties that have been overcome in the development of this novel process has been the fact that in known processes of curing epoxy resin an increase in the HDT was accompanied by a marked decrease in the pot life of the uncured epoxy resin and hardener material. For example, in order to form a cured resin material having an HDT in the order of 445° F., sufficient curing components, such as a mixture of anhydrides, were dissolved in preheated (160° F.–250° F.) epoxy resin. The pot life of the resulting material was less than one hour, and to increase the pot life to several hours it was necessary to reduce the percentage of hardeners or to modify their ratio, which would result in a marked decrease in the HDT.

In accordance with the present invention, it has been found that rigid composite structures can be produced which have structural elements thereof, such as metal members, etc., bonded together by a cured epoxy resin product having a high HDT, such as in the order of 450° F. and higher (e.g., up to about 550° F.) and with a pot life of several days. This is accomplished by intermixing a single hardening or curing agent, pyromellitic dianhydride, with a liquid epoxy resin and a finely divided inorganic filler to form a homogeneous suspension. The temperature is maintained below a value of about 125° F. and preferably at room temperature. This liquid suspension can thereafter be introduced, by pouring or other conventional means, into a cavity such as a mold or form by abutting at least two separate structural members, and is subsequently heated to a temperature in the order of 225° F.–250° F. for about three hours to form an epoxy resin product which firmly bonds the structural members together. The HDT of such product is usually relatively low, for example, in the order of 125° F. Such a composite structure is then put into operation as a component of apparatus which under normal operating conditions develops an operating temperature higher than 125° F., and it has been found that not only does the component operate satisfactorily, but that as the apparatus operates the HDT increases so that the characteristics of the resin product will progressively improve. Thus, as the structure is subjected to normal operating conditions, the characteristics of the resin product, such as bonding strength in HDT, are progressively increased to values always in excess of that needed to bond the structural members together under normal operating stresses and conditions. In most instances, the HDT increases in advance of increases in operating tempeartures of the component in the apparatus, so that it will be in excess of the operating temperature of the structure. The process of this invention provides a final product in which the cured resin has enhanced properties, for example, improved shrink characteristics and high HDT, and yet the pot life of the uncured resin-filler-curing agent mixture is in the order of several days, and it is not necessary to extend the time for producing the product past a few hours, prior to use.

The epoxy resins useful in the present invention may be any of those available in pourable liquid form (preferably having a viscosity of not greater than 500 poises). Specifically, liquid epoxy resins, such as the following, are preferred:

| Trade Designation and Source | Color | Visc. (poises) | Epoxide Equivalent |
|---|---|---|---|
| ERL 2774 (formerly identified as Bakelite C-8 resin, BR-18774)—Bakelite Co. | 10 max.. | 105–195 | 185–200 |
| ERL 3794—Bakelite Co | 5 max... | 72–192 | 170–182 |
| Araldite 6005—Ciba Co | 4 | 80–130 | 190 |
| Araldite 6010—Ciba Co | 4 | 100–250 | 195 |
| Araldite 6020—Ciba Co | 4 | 190 | 210 |
| Epon 815—Shell Chem. Co | 8 max... | 5–9 | 175–210 |
| Epon 820—Shell Chem. Co | 8 max... | 40–100 | 175–210 |
| Epon 828—Shell Chem. Co | 12 max.. | 50–150 | 175–210 |
| Epi-Rez 510—Jones-Dabney Co | 6 | 90–180 | 180–200 |

The single hardening or curing agent employed in this process, pyromellitic dianhydride, is a finely divided white powder and is commercially available. The fillers are finely divided inorganic materials such as zirconium silicate, aluminum silicate, various metal oxides (e.g., silicon dioxide) and mixtures thereof. Specific exemplary fillers include hydrated aluminum silicate (such as that sold under the trade designation "ASP–400" by Edgar Bros. Co.) with an average particle size of 4.8 microns, and zirconium silicate (sold under the trade designation "Milled Zircon" by Foote Mineral Co.) with a particle size of about 74 microns (90% through 200 mesh). Zirconium silicate is particularly desirable as the filler, or as one of two or more filler components, as it functions to reduce shrink. When used in combination with more finely divided aluminum silicate, a balanced filler mixture results which inhibits settling during pot life. In addition to the liquid epoxy resin curing agent and a filler, pigments and plasticizers or flexibilizers may be included as components in the practice of this invention. An exemplary plasticizer or flexibilizer is a polyester (such as that sold under the trade designation "ZL–207" by Thiokol Chemical Corp.) having the following typical properties:

| | Value |
|---|---|
| Viscosity, at 80° F _____ poises__ | 50–80 |
| Specific gravity, at 77° F _____ | 1.18 |
| Color _____ | 4 |
| Refractive index, at 77° F _____ | 1.47 |
| Volatiles _____ percent__ | 0.5 |

It is preferred that any plasticizer used does not function as a curing agent for the epoxy resin.

Referring now to the drawings, an electromagnetic friction clutch or brake unit constituted by a coil housing assembly is indicated generally at reference numeral 10. This assembly 10 has a pole piece 12 comprising a portion 14 disposed in a plane substantially normal to the axis of rotation of the coil housing assembly and a portion 16. The drawings illustrate portion 16 being frusto-conical in shape and it is to be understood that the invention is not limited to such a configuration and that this portion of the pole housing can be disposed at any angle which provides a coil enclosing pole piece. A pole piece 18 is disposed radially inward from pole piece portion 16 and is of a sleeve configuration located coaxially with pole piece portion 16. An annular electrical coil 20 is disposed radially between pole piece portion 16 and pole piece 18 and axially intermediate the axial end faces of pole piece portion 18. During assembly of the coil housing, the structure is in a position such that portion 14 of pole piece 12 is disposed horizontally and coil 20 is adapted to be held in a spaced assembling position by epoxy resin spacers or insulator clips 22 which are located in axially overlapping relation to coil 20 and disposed radially between coil 20 and pole piece 18. An annular ring or disc of friction material 28 is positioned substantially parallel to portion 14 of pole piece 12 and axially coextensive with the open end faces of pole pieces 16 and 18. Pole piece portion 14 is provided with a pair of circumferentially spaced holes 30 and 32, respectively, for a purpose hereinafter described.

Suitable coil connecting means 34 and 36 are receivable in circumferentially spaced holes 38 and 40 and comprise nylon insulator sleeves 42 and 44 having brass insert sleeves 46 and 48 disposed therein. Brass screws 50 and 52 are threaded into brass insert sleeves 46 and 48, respectively, and have soldered thereto wires 54, 56, 58 and 60, respectively, which are in turn connected to coil 20 to provide a means to carry current to the coil. The specific details of these coil connections form no part of the present invention but are illustrated merely to show one convenient means of providing a coil connection.

When the above mentioned components have been positioned for filling with the resin-filler-curing agent suspension, a suitable plate or retaining means 29 is positioned or clamped over the friction material 28 merely for the purpose of holding the components in assembled position. Pole pieces 12 and 18 are maintained in an assembled relationship due to the abutment or surface 62 of pole piece 18 against surface 64 of pole piece 12. After the coil housing is held in a fixed or assembled position as heretofore described, a suitable nozzle is inserted in hole 30 and the epoxy resin-filler-curing agent suspension 66 is flowed into a cavity C formed by abutting the two pole pieces 12 and 18, and friction material 28. When cavity C has been filled with this liquid material, the excess will flow out through hole 32. As heretofore mentioned, assembly 10 is filled with the epoxy resin-filler-curing agent suspension and is then heated to about 225° F.–250° F. for about three hours to form an epoxy resin product which firmly bonds the structural members together, thereby forming a rigid composite structure. After the resin hardens, the excess is trimmed away from around holes 30 and 32. The bond between the epoxy resin and pole pieces 12, 18 and friction material 28 is relied upon to maintain the elements in a unitary assembled structure, and the bonded structure is, as a last step of the method of the present invention, thereafter subjected to normal operating conditions to progressively enhance the characteristics of the resin product so that it will always maintain the members in a fixed structural relationship under normal operating stresses and conditions.

The following examples illustrate the invention.

*Example 1*

Pyromellitic dianhydride (26 parts by weight) was mechanically intermixed at room temperature with liquid epoxy resin ERL 2774 (100 parts by weight) and finely divided zirconium silicate (100 parts by weight) to form a homogeneous dispersion of these three components. After five days the resin-curing agent-filler mixture had not set up and was poured into the cavity or mold C. The assembly 10 and contained epoxy resin-curing agent-filler suspension were heated to 230° F. for three hours. The pole pieces 12 and 18, coil 20, clips 22 and disc 28 were firmly bonded together, thereby forming a rigid structure. This structure was operated as a component of a clutch, where operating temperatures were in the order of 300° F. with short intermittent periods reaching about 350° F. The characteristics of the resin product progressively improved as operation proceeded and the bonding strength thereof was always in excess of that required to bond the structural members together under normal operating conditions, such as stresses and temperatures. After the resulting composite structure was operated for about 72 hours at the above operating temperatures, the HDT value (determined by the ASTM method) of the resin product was found to be 450° F.

*Example 2*

Example 1 was repeated except that the resin mixture was as follows:

| Component: | Parts by weight |
|---|---|
| Liquid epoxy resin (Ciba "Araldite 6005" or Bakelite "ERL 2774") | 31.4 |
| Aluminum silicate ("ASP–400") | 21.0 |
| Zirconium silicate ("Milled Zircon") | 31.4 |
| Plasticizer ("Thiokol ZL–207") | 8.4 |
| Pyromellitic dianhydride | 7.8 |

The following HDT values of the resin product were obtained after the resulting rigid composite structure was operated at a temperature averaging approximately 250° F. for the following periods of operation:

| Hours of operation | HDT ° F. |
|---|---|
| 3 | 190 |
| 6 | 245 |
| 9 | 265 |
| 12 | 360 |
| 15 | 365 |
| 20 | 410 |

*Example 3*

Example 2 was repeated except that the rigid composite structure was operated for twenty hours at 450° F. and the HDT thereafter was determined to be 532 ° F.

It is to be understood that pigments, such as iron oxide derivatives, may also be added as well as various amine dyes. These optional additives are employed to vary the physical appearance and certain characteristics in ways known to those skilled in this art. Also, although it is preferred that pyromellitic dianhydride be used in the ratio of approximately 25% by weight by the liquid epoxy resin, other percentages between about 15%–30% by weight are operable, the HDT decreasing and the flexibility increasing with smaller percentages.

In view of the above, it will be seen that the several objects of the invention are achieved and other advantageous results attained.

As various changes could be made in the above methods without departing from the scope of the invention, it is intended that all matter contained in the above description or shown in the accompanying drawing shall be interpreted as illustrative and not in a limiting sense.

I claim:

1. The method of making a rigid composite structure which normally operates at relatively high temperatures, comprising flowing a heat hardenable resin composition into a cavity formed by abutting at least two separate structural members, said resin composition comprising a homogeneous suspension of a liquid epoxy resin and a single curing agent consisting of pyromellitic dianhydride, and a finely divided inorganic filler, which suspension has a pot life of up to approximately five days, and heating said suspension to a temperature of between approximately 225° F. to 250° F. for about three hours thereby to only partially cure said resin composition and to bond said members together by an epoxy resin product, whereby subsequent operation of the resulting rigid composite structure at said relatively high temperatures progressively improves the characteristics of said resin product and the bonding strength of the product is progressively increased to values always sufficient to bond the structural members together under normal operating stresses and conditions.

2. The method of making a rigid composite structure which normally operates at relatively high temperatures not substantially in excess of approximately 500° F., comprising flowing a heat hardenable resin composition into a cavity formed by abutting at least two separate structural members, said resin composition comprising a homogeneous suspension of a liquid epoxy resin with between approximately 15% to 30% by weight of a single curing agent consisting of pyromellitic dianhydride, a plasticizer and a finely divided inorganic filler, which suspension has a pot life of up to approximately five days, heating said suspension to a temperature of approximately 230° F. for about three hours thereby to only partially cure said resin composition and to bond said members together by an epoxy resin product, and subsequently operating the resulting rigid composite structure at said relatively high temperatures to progressively improve the characteristics of said resin product and progressively increase the bonding strength of the product to values always in excess of that needed to bond the structural members together under normal operating stresses and conditions and progressively increase the heat distortion temperature to a value not in excess of approximately 550° F.

3. The method of making a rigid composite structure which normally operates at relatively high temperatures not substantially in excess of approximately 500° F., comprising flowing a heat hardenable resin composition at a temperature of between approximately 150° F. and 180° F. into a cavity formed by abutting at least two separate structural members, said resin composition comprising a homogeneous suspension of a liquid epoxy resin with between approximately 15% and 30% by weight of a single curing agent consisting of pyromellitic dianhydride, a plasticizer and a finely divided inorganic filler, heating said suspension to a temperature of about 230° F. for about three hours thereby to only partially cure said resin composition and to bond said members together by an epoxy resin product, and subsequently operating the resulting rigid composite structure at said relatively high temperatures to increase the heat distortion temperature of said resin product up to a value not in excess of approximately 550° F. while maintaining said heat distortion temperature at a value in excess of the operating temperature of said rigid composite structure.

References Cited in the file of this patent
UNITED STATES PATENTS

| | | |
|---|---|---|
| 1,781,074 | Norton | Nov. 11, 1930 |
| 2,324,483 | Castan | July 20, 1943 |
| 2,690,819 | Meyer | Oct. 5, 1954 |
| 2,745,924 | Coates | May 15, 1956 |
| 2,751,665 | DeRoovere | June 26, 1956 |
| 2,765,878 | Pierce | Oct. 9, 1956 |
| 2,768,153 | Shokal | Oct. 23, 1956 |
| 2,818,517 | Loosjes | Dec. 31, 1957 |

OTHER REFERENCES

"Room Temperature Bonding," Modern Plastics, March 1956, pages 126, 128, 133, 134, 136, 137 and 244.

Charlton: "Alloying with Epoxies," Modern Plastics, Sept. 1954, pp. 155–157, 160–161, 240–243.